3,704,293
5-METHYL-2-(STYRYLPHENYL)-4-TRIAZOLE-CARBOXAMIDE BRIGHTENERS

Albert F. Strobel and Maynard L. Whitehouse, Delmar, N.Y., assignors to GAF Corporation, New York, N.Y.
No Drawing. Filed June 17, 1970, Ser. No. 47,177
Int. Cl. C07d 55/02
U.S. Cl. 260—240 C     13 Claims

ABSTRACT OF THE DISCLOSURE

A new class of brightening compounds having the formula:

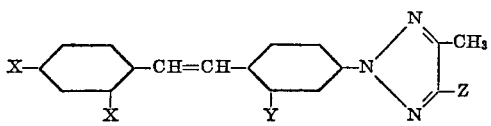

wherein
one X represents hydrogen and the other X represents a lower alkoxy or a lower alkoxy which is substituted by the groups: —CONH(CH$_2$)$_{1-2}$CH$_2$NRR$_1$ and

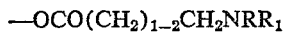
—OCO(CH$_2$)$_{1-2}$CH$_2$NRR$_1$ in which R and R$_1$ represent hydrogen, lower alkyl, amine-substituted alkyl, cyclohexyl, benzyl and phenyl; Y represents hydrogen, halogen, cyano, or a carboxamide or sulfonamide substituent, such as CONR$_2$R$_3$ or SO$_2$NR$_2$R$_3$; R$_2$ and R$_3$ represents hydrogen, lower alkyl, cyclohexyl, benzyl, phenyl, and when R$_2$ is lower alkyl it may be further substituted by —CH$_2$NRR$_1$;
Z is —CONR$_2$R$_3$; and
at least one of X, Y and Z must contain the grouping —CH$_2$NRR$_1$;

which compounds are particularly well suited for usage as fluorescent brightening agents in connection with fibrous foils and molds of polyacrylonitrile and related products.

---

The instant invention is directed to novel 5-methyl-2-(styrylphenyl)-4-triazolecarboxamide derivatives. In particular, the instant invention is directed to 5-methyl-2-(styrylphenyl)-4-triazolecarboxamide compounds which are particularly well suited for use as brightening agents particularly in connection with polyacrylonitrile materials.

It is well known that textiles, and in addition various plastics in the film or solid form, tend to develop a yellow shade upon aging which cannot be removed by ordinary techniques of bleaching and/or washing. Heretofore, this problem of yellowing has been solved by methods which involve the techniques of "blueing" like materials with blue pigments or fugitive blue dyestuffs. Such techniques, however, have become obsolete and have been supplanted to a great extent by those techniques which employ fluorescent optical bleaching agents and/or brighteners. Such bleaching agents and/or brighteners can be employed as additives in the soap or detergent or used in the dye bath, or in addition in so-called melt incorporation techniques wherein the material is incorporated into the plastic mass prior to shaping thereof. Such fluorescent optical bleaching agents perform their desired function by virtue of their characteristic absorption of ultraviolet radiation, and the subsequent conversion of this energy to light energy within the visible spectrum. The thus converted intermediate energy tends to neutralize any yellowness of the material and thereby increases the inherent whiteness thereof.

It is well known in the art to employ stilbyl-triazole compounds as a brightening agent for purposes of eliminating the yellow shade of textiles, papers, plastics and the like. Such compounds are disclosed in the U.S. Pat. 2,713,057. It is noted in connection with the compounds of the above patent that said stilbyl-triazole compounds contain a water-solubilizing group and are used primarily for cellulosic and amine-containing fibers. Other stilbyl-triazole compounds do not contain solubilizing groups and are used in dispersed form to brighten fabrics, and in particular, polyester, nylon, polyolefin, and to some extent polyacrylonitrile fabrics.

We have now found a new group of stilbyl-triazole compounds which are particularly useful as fluorescent brightening agents in general and, in particular, as brightening agents for fibers, foils and molds of polyacrylonitrile and related products. The compounds of the instant invention have unique and unexpected advantages over those previously employed and, therefore, it is an object of the instant invention to provide a new class of stilbyl-triazole compounds which are particularly useful as brightening agents.

A further object of the instant invention is to provide a group of stilbyl-triazole compounds which are particularly suited for use in the brightening of polyacrylonitrile, and related products.

A still further object of the instant invention is to provide a group of stilbyl-triazole compounds which are useful as brightening agents for fibers, foils and molds.

A still further object of the instant invention is to provide a new class of 5-methyl-2-(styrylphenyl)-4-triazolecarboxamide compounds which compounds are particularly well suited as brightening agents.

These and other objects of the instant invention will become more evident from the following more detailed discussion thereof.

As noted above, applicants have found a new group of stilbyl-triazole compounds which are particularly well suited for use as fluorescent brightening agents for fibers, foils and molds of numerous products and, in particular, of polyacrylonitrile and related products. The compounds of the instant invention are stilbyl-triazoles prepared from acetoacetic ester intermediates and have an alkoxy substitutent ortho or para to the ethylene linkage in the outer stilbene ring. Furthermore, the subject compounds contain in the molecule at least one acyl and one basic amino substituent.

The compounds which fall within the scope of the instant invention have the formula:

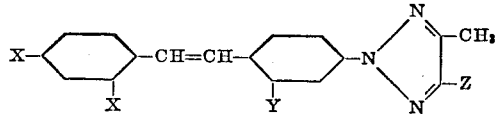

wherein
one X represents hydrogen and the other X represents a lower alkoxy or a lower alkoxy which is substituted by the groups: —CONH(CH$_2$)$_{1-2}$CH$_2$NRR$_1$ and

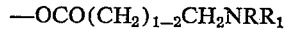
—OCO(CH$_2$)$_{1-2}$CH$_2$NRR$_1$

R and R$_1$ represents hydrogen, lower alkyl, amine-substituted alkyl, cyclohexyl, benzyl and phenyl;
Y represents hydrogen, halogen, cyano, or a carboxamide or sulfonamide substituent, such as CONR$_2$R$_3$ or SO$_2$NR$_2$R$_3$; R$_2$ and R$_3$ represents hydrogen, lower alkyl, cyclohexyl, benzyl, phenyl, and when R$_2$ is lower alkyl it may be further substituted by —CH$_2$NRR$_1$;
Z is —CONR$_2$R$_3$; and
at least one of X, Y and Z must contain the grouping —CH$_2$NRR$_1$;

which compounds are particularly well suited for usage as flourescent brightening agents in connection with fibrous foils and molds of polyacrylonitrile and related products.

In the aforementioned formula it is noted that the term lower alkyl is intended to encompass both branched and straight chain lower alkyl substituents such as methyl, ethyl, propyl, butyl, secondary butyl, tertiary butyl, pentyl, hexyl, and heptyl substituents. The term lower alkoxy is intended to include bub is not limited to methoxy, ethoxy, propoxy, butoxy, secondary butoxy, tertiary butoxy, pentoxy, hexoxy and heptoxy substituents.

It is noted as stated above, that the subject compounds are particularly well suited as brightening agents. As a result of their use, the brightened products have a high degree of light fastness; that is to say, the treated products do not readily lose their brightness on exposure to ultraviolet light, thus, making the brightening agents of the instant invention particularly well suited for their use as brightening agents.

The compounds of the instant invention are in general produced by diazotizing a compound which has the formula:

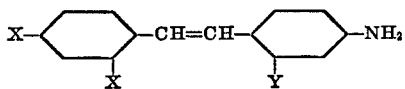

wherein X and Y have the same meaning as described herein. The diazotized compound is then coupled with an approximately equivalent amount of acetoacetic acid, lower alkyl ester to give a product which has the formula:

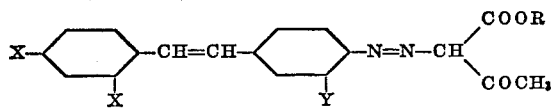

This product is then dissolved in a suitable solvent, such as, for example, pyridine, picoline or dimethyl formamide and is treated with ammonia usually at atmospheric pressure, although any pressure may be employed, and at a temperature of from about 20° to about 50° C. for a period of about 5–24 hours. Subsequent to stripping off the excess ammonia and solvent, a product results which has the formula:

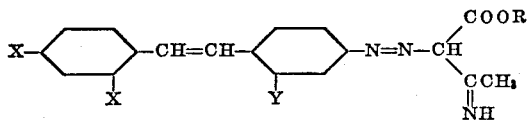

This product is then oxidized in a known manner to produce a compound which has the formula:

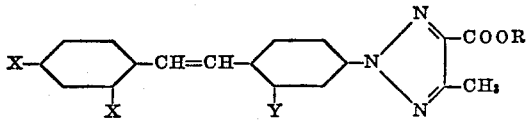

A convenient means of carrying out the oxidation is by use of cupric chloride in a pyridine or picoline solvent although other well known techniques may be employed.

This product is then reacted with the desired amine having the formula $NHR_2R_3$ wherein $R_2$ and $R_3$ have the same meaning as described herein. A minimum of an equivalent of amine up to a solvent excess of amine is generally employed. The reaction is usually carried out at elevated temperature, i.e., from about 90° to about 150° C. and the reaction time is from about 3 to about 24 hours. The product, which results has the formula:

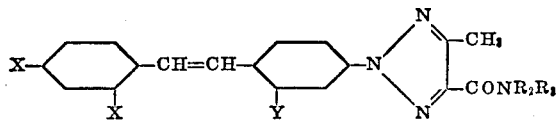

and it is then drowned into water, filtered, washed and dried.

Numerous aminostilbene compounds may be employed as the intermediates in the production of the subject brighteners of the instant invention. Among those which may be employed are the following:

4-amino-4'-methoxystilbene
4-amino-4'-ethoxystilbene
4-amino-4'-butoxystilbene
4-amino-2'-methoxystilbene
4-amino-2'-ethoxystilbene
4-amino-2'-butoxystilbene
4-amino-2-chloro-4'-methoxystilbene
4-amino-2-fluoro-4'-butoxystilbene
4-amino-2-bromo-4'-ethoxystilbene
4-amino-2-cyano-4'-ethoxystilbene
4-amino-2-cyano-2'-methoxystilbene
4-amino-4'-methoxy-2-stilbenecarboxamide
4-amino-4'-methoxy-N-methyl-2-stilbenecarboxamide
4-amino-4'-methoxy-N,N-dimethyl-2-stilbenecarboxamide
4-amino-2'-methoxy-N,N-dimethyl-2-stilbenecarboxamide
4-amino-4'-methoxy-N,N-diethyl-2-stilbenecarboxamide
4-amino-4'-methoxy-N,N-dibutyl-2-stilbenecarboxamide
4-amino-4'-methoxy-N-cyclohexyl-2-stilbenecarboxamide
4-amino-4'-methoxy-N-benzyl-2-stilbenecarboxamide
4-amino-4'-methoxy-2-stilbenecarboxanilide
4-amino-4'-methoxy-2-stilbenecarbox-o-anisidide
4-amino-4'-methoxy-2-stilbenecarbox-o-toluidide
4-amino-4'-methoxy-2-stilbenesulfonamide
4-amino-4'-methoxy-N-methyl-2-stilbenesulfonamide
4-amino-4'-methoxy-N,N-dimethyl-2-stilbenesulfonamide
4-amino-2'-methoxy-N,N-dimethyl-2-stilbenesulfonamide
4-amino-4'-methoxy-N,N-dibutyl-2-stilbenesulfonamide
4-amino-4'-methoxy-N-cyclohexyl-2-stilbenesulfonamide
4-amino-4'-methoxy-N-benzyl-2-stilbenesulfonamide
4-amino-4'-methoxy-2-stilbenesulfonanilide
4-amino-4'-methoxy-2-stilbenesulfonoxylidide
4-amino-4'-methoxy-2-stilbenesulfonocresidide
4-amino-4'-methoxy-N-(2-dimethylaminoethyl)-2-stilbenecarboxamide
4-amino-4'-methoxy-N-(3-diethylaminopropyl)-2-stilbenecarboxamide
4-amino-4'-methoxy-N-(3-dimethylaminopropyl)-2-stilbenecarboxamide
4-amino-4'-methoxy-N-(3-dimethylaminopropyl)-N-methyl-2-stilbenecarboxamide
4-amino-4'-methoxy-N-(2-dimethylaminoethyl)-2-stilbenesulfonamide
4-amino-4'-methoxy-N-(2-diethylaminoethyl)-2-stilbenesulfonamide
4-amino-4'-methoxy-N-(3-dimethylaminopropyl)-2-stilbenesulfonamide
4-amino-4'-methoxy-N-(2-dibutylaminoethyl)-2-stilbenesulfonamide
4-amino-4'-methoxy-N-(3-dimethylaminopropyl)-N-methyl-2-stilbenesulfonamide
4-amino-4'-(2-dimethylaminoethylcarbamoylethoxy)-stilbene
4-amino-4'-(2-dimethylaminopropylcarbamoylpropoxy)-stilbene
4-amino-4'-(2-dimethylaminopropionylethoxy)-stilbene
4-amino-4'-(3-dimethylaminobutyrylpropoxy)-stilbene
4-amino-4'-(2-diethylaminopropionylethoxy)-stilbene
4-amino-4'-(2-dibutylaminopropionylethoxy)-stilbene
4-amino-2'-(2-dimethylaminoethylcarbamoylethoxy)-stilbene
4-amino-2'-(3-dimethylaminobutyrylethoxy)-stilbene
4-amino-4'-(2-dimethylaminoethylcarbamoylethoxy)-N-(2-dimethylaminoethyl)-2-stilbenecarboxamide
4-amino-4'-(3-dimethylaminopropylcarbamoylpropoxy)-N-(2-dimethylaminoethyl)-2-stilbenesulfonamide 4-amino-4'-(2-dimethylaminopropionylethoxy)-N-(2-dimethylaminoethyl)-2-stilbenecarboxamide
4-amino-4'-(3-diethylaminobutyrylethoxy)-N-(2-dimethylaminoethyl)-2-stilbenesulfonamide
4-amino-4'-(2-dimethylaminopropionylethoxy)-2-chlorostilbene
4-amino-4'-(2-dimethylaminopropionylethoxy)-2-cyanostilbene
4-amino-4'-(2-dimethylaminoethylcarbamoylethoxy)-2-chlorostilbene It is to be noted, however, that the instant invention is not to be deemed as being limited to the above-noted aminostilbenes and that other compounds similar thereto may also be employed.

The amine compound having the formula $NHR_2R_3$ may be represented by the following compounds:

ammonia
methylamine
dimethylamine
ethylamine
diethylamine
propylamine
isopropylamine
butylamine
isobutylamine
dibutylamine
cyclohexylamine
dicyclohexylamine
benzylamine
aniline
anisidine
toluidine
xylidine
cresidine
2-(methylamino)ethylamine
2-(dimethylamino)ethylamine
3-(dimethylamino)propylamine
2-(dibutylamino)ethylamine
3-(dimethylamino)propylamine
4-(dimethylamino)butylamine
2-(cyclohexylamino)ethylamine
2-(benzylamino)ethylamine
2-anilinoethylamine
N-methyl-N-[2-(dimethylamino)-ethyl]amine
di(2-aminoethyl)amine It is to be noted, however, that the above-noted amines are merely exemplary of those which may be employed in connection with the instant invention and numerous other related compounds may also be employed in connection herewith.

As indicated above, the subject brightening agents of the instant invention are advantageously employed as brightening agents in connection with fibers, foils and molds of polyacrylonitrile and related products. It is to be noted that the subject compounds may also be employed in connection with plastics in general and such synthetics as polyamides and polyurethane fibers and films. In this connection, the subject compounds may be applied to the fiber at concentrations of from about 0.01% to about 0.5% from an aqueous bath in a conventional manner. The temperature of application is preferably from about 180° F. up to about 220° F. and the aqueous bath should, preferably, have a pH range from about 1 to about 5. It is noted that it is also preferred that the brightening agents be allowed to remain in contact with the fiber for a period of from about 15 minutes to 1 hour. In connection with all of the foregoing concentration, temperature, pH and time conditions it is noted that they are preferred and that the instant invention is not deemed as being limited thereto. It is also noted that the subject brightening compounds may be incorporated into a melt of the material which is to be formed into a fiber subsequent thereto, thus, providing a more prolonged brightening effect therein. Furthermore, subsequent to formation of the fiber and fabric therefrom said fabric may be prebleached with a sodium hypochlorite bleach. If such a prebleaching process is employed, it is preferred to remove the excess hypochlorite with sodium bisulfite prior to dyeing the fiber in a known manner with a brightener solution.

The instant invention will now be illustrated by the following more detailed examples thereof. It is to be noted, however, that the instant invention is not deemed as being limited thereto.

EXAMPLE 1

Preparation of the compound having the formula:

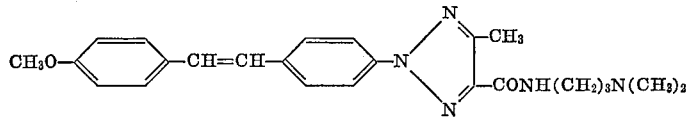

19.57 g. 4-amino-4'-methoxystilbene (0.087 mole), 40 cc. water and 22.5 cc. concentrated hydrochloric acid were mixed and stirred for one hour on a steam bath after which time the mixture was cooled externally to 15–20° C. 16 cc. sodium nitrite solution (38.5% wt./vol.) was then added and after stirring for 2 hours at 20–25° C. the excess nitrite was destroyed with dilute aqueous sulfamic acid. The resulting diazo mixture was then added to a mixture of 300 cc. picoline, 135 cc. water and 11.9 g. acetoacetic acid, ethyl ester (0.0913 mole), and the charge was stirred overnight at room temperature after which it is filtered, the filter cake washed with water and dried to give 28.2 g. of the dyestuff having the formula:

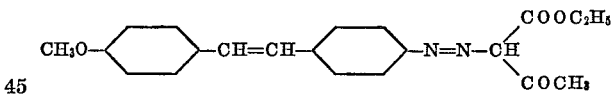

Calc'd. for $C_{21}H_{22}N_2O_4$ (percent): C, 68.85; H, 6.05; N, 7.65. Found (percent): C, 69.31 and 69.38; H, 6.20 and 6.20 N, 7.87 and 7.98. $K_{max.}=101.5$ at 400 m$\mu$. M.P.=130.4–133.6° C.

0.0682 mole of this product was dissolved in 500 cc. picoline and gaseous ammonia was passed into the solution at room temperature and at atmospheric pressure for 13 hours. The excess ammonia and solvent were then stripped off under reduced pressure to yield a mixture of the dyestuff having the formula:

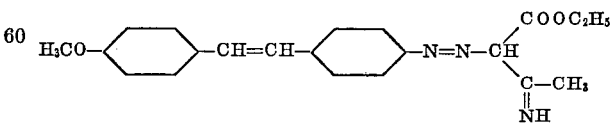

together with some of the initial keto azo dye.

14.6 g. (about 0.04 mole) of this mixture of intermediate was added to 300 cc. picoline containing 0.1 mole anhydrous cupric chloride. The charge was then heated to 90° C. for 3 hours, and subsequently cooled to 80° C., the copper salts were then precipitated with sodium sulfide flakes and the resulting slurry was clarified, the picoline distilled off, and the residue cooled and filtered. The filter cake was recrystallized from dimethyl formamide after treatment with activated charcoal to yield the desired product having a $K_{max.}=136.0$ at 342 m$\mu$. M.P.=153.6–154.4° C.

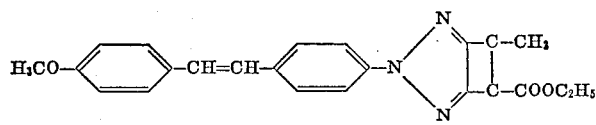

Calc'd. for $C_{21}H_{21}N_3O_3$ (percent): C, 69.50; H, 5.82; N, 11.58. Found (percent): C, 69.63 and 69.63; H, 5.88 and 5.98; N, 11.74 and 11.74.

0.0275 mole of this product was added to 25 cc. 3-(dimethylamino) propylamine and the charge was heated 6 hours at 110°–120° C. The charge was then drowned with water, filtered and the filter cake washed with water, isopropanol and dried. Recrystallization of the dry filter cake from methanol gave the desired product having a $K_{max.}=120.7$ at 342 m$\mu$. M.P.=187.6–190.0° C.

Calc'd. for $C_{24}H_{29}N_5O_2$ (percent): C, 68.76; H, 6.98; N, 16.70. Found (percent): C, 70.40 and 70.70; H, 7.08 and 7.08; N, 17.15 and 17.28.

EXAMPLE 2

Preparation of the compound having the formula:

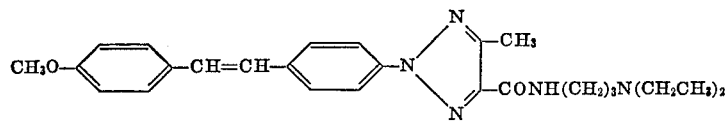

The procedure of Example 1 was repeated with the exception that in lieu of 3-(dimethylamino) propylamine, 25 cc. of 3-(diethylamino)propylamine was employed. Recrystallization of the crude product from isopropanol gave the above-noted product having a $K_{max.}=113.1$ at 346 m$\mu$. M.P.=148.2°–150.0° C.

Calc'd. for $C_{25}H_{22}N_5O_2$ (percent): C, 69.75; H, 7.42; N, 15.39. Found (percent): C, 71.47 and 71.47; H, 7.56 and 7.60; N, 15.83 and 15.83.

EXAMPLE 3

Preparation of the compound having the formula:

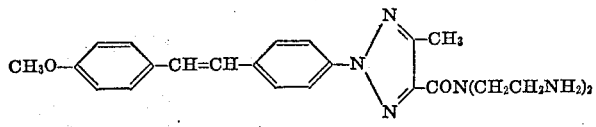

0.0055 mole of the intermediary stilbyltriazolyl ester of Example 1 was added to 5 cc. of diethylenetriamine-[di-(2-aminoethyl)amine] and the charge was heated for 3 hours at 100° C. The resulting reaction product was then drowned with 75 cc. of water, filtered and the filter cake washed with water and dried to yield 1.95 g. of the above-noted compound having a $K_{max.}=134.4$ at 344 m$\mu$.

Calc'd. for $C_{23}H_{28}N_6O_2$ (percent): C, 65.75; H, 6.69; N, 19.98. Found (percent): C, 65.27 and 65.00; H, 6.65 and 6.61; N, 19.69 and 19.69.

EXAMPLE 4

Preparation of the compound having the formula:

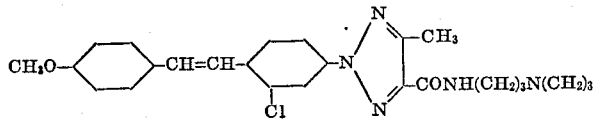

15.7 g. 4-amino-2-chloro-4'-methoxystilbene (0.0605 mole), 45 cc. water and 15.7 cc. concentrated hydrochloric acid were mixed and stirred for one hour on a steam bath after which time the mixture was cooled externally to 15–20° C. 11.0 cc. sodium nitrite solution (38.5% wt./vol.) was added and after stirring for 2 hours at 20–25° C. the excess nitrite was then destroyed with dilute aqueous sulfamic acid. The resulting diazo mixture was then added to a mixture of 200 cc. picoline, 90 cc. water, and 8.25 g. ethyl acetoacetate [acetoacetic acid, ethyl ester] (0.0635 mole) and the charge was stirred overnight at room temperature after which time it was filtered, the filter cake washed with water and dried to give 21.8 g. of dyestuff having a $K_{max.}=71.6$ at 387. M.P.=87.2°–90.0° C. The dyestuff has the formula:

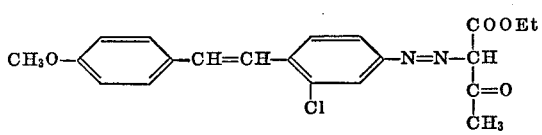

0.0544 mole of this product was dissolved in 400 cc. picoline and gaseous ammonia was passed into the solution at room temperature and at atmospheric pressure 13 hours subsequent to which the excess ammonia and solvent were then stripped off under reduced pressure to yield a mixture of the dyestuff having the formula:

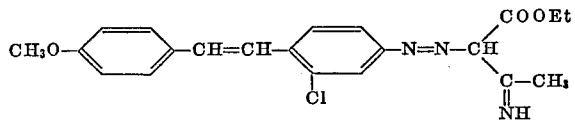

together with some of the initial keto azo dye.

20.3 g. (about 0.05075 mole) of this mixture of intermediates was then added to 375 cc. picoline containing 0.127 mole anhydrous cupric chloride. The charge was then heated to 90° C. for 3 hours, cooled to 80° C., and the copper salts precipitated with sodium sulfide flakes. The resulting slurry was clarified, the picoline distilled off, and the residue cooled and filtered. The filter cake was recrystallized from dimethyl formamide after treatment with activated charcoal to yield the stilbyl triazolyl ester having a $K_{max.}=83.2$ at 343 m$\mu$.

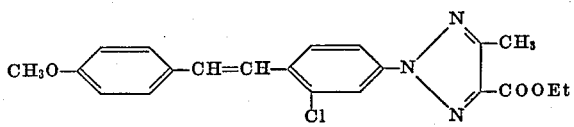

0.0275 mole of this product was added to 25 cc. 3-(dimethylamino) propylamine and the charge was heated 6 hours at 110°–120° C. The charge was then drowned with water, filtered and the filter cake washed with water, then with isopropanol and dried to give the desired product.

EXAMPLE 5

Preparation of the compound having the formula:

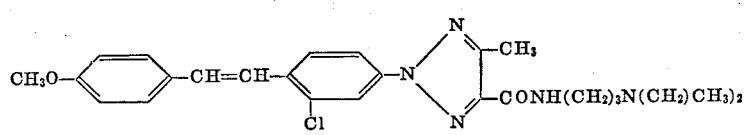

Example 4 was repeated with the exception that in lieu of 3-(dimethylamino)propylamine, 25 cc. of 3-(diethylamino)propylamine was employed.

EXAMPLES 6–11

The procedure of Example 1 was repeated and compounds having the formula

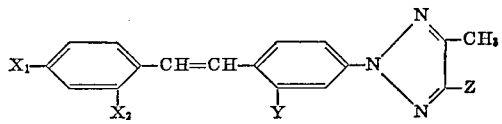

were prepared.

| No. | $X_1$ | $X_2$ | Y | Z |
|---|---|---|---|---|
| 6 | $CH_3O$ | H | Cl | $CON(CH_2CH_2NH_2)_2$ |
| 7 | $CH_3O$ | H | H | $CONH(CH_2)_3N(CH_3)_2$ |
| 8 | H | $CH_3O$ | H | $CONH(CH_2)_3N(CH_2CH_3)_2$ |
| 9 | H | $CH_3O$ | H | $CON(CH_2CH_2NH_2)$ |
| 10 | H | $CH_3O$ | Cl | $CONH(CH_2)_3N(CH_3)_2$ |
| 11 | H | $CH_3O$ | CN | $CONH(CH_2)_3N(CH_3)_2$ |

EXAMPLES 12–14

The procedure of Example 1 was repeated and compounds having the formula

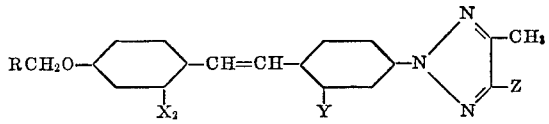

| No. | R | $X_2$ | Y | Z |
|---|---|---|---|---|
| 12 | $C_2H_5COO$ | H | Cl | $CON(CH_2CH_2NH_2)_2$ |
| 13 | $(CH_3)_2N(CH_2)_2NHCO$ | $CH_3O$ | H | $CONH(CH_2)_3N(CH_3)_2$ |
| 14 | $(H_2NC_2H_4)_2NCO$ | $CH_3O$ | H | $CONH(CH_2)_3N(C_2H_5)_2$ |

EXAMPLE 15

50 mg. of the product of Example 1 was dissolved in 100 ml. of dimethylformamide and warmed slightly. 10 ml. and 15 ml. of the above dispersion were mixed with 140 ml. of 0.145% formic acid solution, and 135 ml. of 0.150% formic acid solution respectively, so as to produce a 1% and a 1.5% dyeing O.W.F. respectively. 5 g. swatches of Orlon #75 (polyacrylonitrile fiber) were entered into the dyeing mixtures which were placed on a water bath at 100° F. The dye bath was raised to the boil and maintained at that temperature for 45 minutes. The material was then rinsed 3 times in luke warm water and dried. The dyeings which contained the product of Example 1 showed superior brightness and also light fastness after 5 hours exposure to ultraviolet light (carbon arc) than a similar swatch which was not treated with the brightener composition.

EXAMPLE 16

5 g. swatches of Orlon #75 (polyacrylonitrile fiber) were entered into bleach mixtures containing 10 ml. 1.5% sulfuric acid, 10 ml. 1.27% phosphoric acid, 10 ml. 0.75% sodium chlorite, and 120 ml. of water which mixture was placed on a water bath at 100° F. The bath is raised to the boil and maintained at that temperature for 20 minutes subsequent to which the bleach mixtures were cooled to 160° F. and sufficient 1.5% aqueous sodium bisulfite solution added to destroy any excess bleach. The mixtures were then stirred at 160° F. for 10 minutes.

50 mg. of the product of Example 1 was then dissolved in 100 ml. of dimethylformamide with slight warming. 5 ml., 10 ml., and 15 ml. portions of the above dispersion were added to the prebleach mixtures containing the Orlon swatches to produce a 0.5%, 1.0% and 1.5% dyeings O.W.F. respectively. The new mixtures were then heated to the boil and maintained at that temperature for 30 minutes. The material was then rinsed 3 times in luke warm water and dried. The dyeings which contained the product of Example 1 showed superior brightness and also light fastness after 5 hours exposure to ultraviolet light (carbon arc) than did a similar swatch not having been treated with the brightener.

What is claimed is:

1. A brightening compound having the formula:

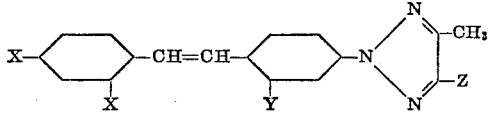

wherein one X is hydrogen and the other X is selected from the group consisting of lower alkoxy and lower alkoxy substituted by the groups

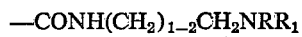

and

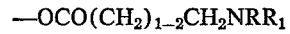

in which R and $R_1$ are selected from the group consisting of hydrogen, lower alkyl, cyclohexyl, benzyl and phenyl; Y is selected from the group consisting of hydrogen, halogen, cyano, $-CONR_2R_3$, and $-SO_2NR_2R_3$; $R_2$ and $R_3$ are selected from the group consisting of hydrogen, lower alkyl, cyclohexyl, benzyl, phenyl, and lower alkyl substituted by $-CH_2NRR_1$; and Z is $-CONR_2R_3$ with the proviso that at least one of the substituents represented by X, Y and Z contains the grouping $-CH_2NRR_1$.

2. The compound of claim 1 wherein Y is $-CONR_2R_3$.
3. The compound of claim 1 wherein Y is $-SO_2NR_2R_3$.
4. The compound of claim 1 wherein one X represents methoxy, Y represents hydrogen and Z represents
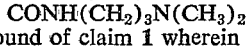
5. The compound of claim 1 wherein one X represents methoxy, Y represents hydrogen and Z represents
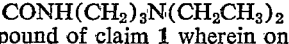
6. The compound of claim 1 wherein one X represents methoxy, Y represents hydrogen and Z represents
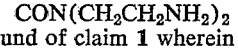
7. The compound of claim 1 wherein one X represents methoxy, Y represents chloro and Z represents
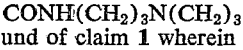
8. The compound of claim 1 wherein one X represents methoxy, Y represents chloro and Z represents
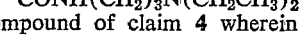
9. The compound of claim 4 wherein said methoxy group is para to the ethylenic bridge.
10. The compound of claim 5 wherein said methoxy group is para to the ethylenic bridge.
11. The compound of claim 6 wherein said methoxy group is para to the ethylenic bridge.
12. The compound of claim 7 wherein said methoxy group is para to the ethylenic bridge.
13. The compound of claim 8 wherein said methoxy group is para to the ethylenic bridge.

References Cited
UNITED STATES PATENTS 3,453,268   7/1969   Dorlars et al. ____ 260—240 C
3,459,744   8/1969   Dorlars et al. ____ 260—240 C JOHN D. RANDOLPH, Primary Examiner U.S. Cl. X.R.

117—33.5 T; 252—301.2 W, 543; 260—192